US011913635B2

(12) United States Patent
He et al.

(10) Patent No.: US 11,913,635 B2
(45) Date of Patent: Feb. 27, 2024

(54) LENS AND ILLUMINATION METHOD

(71) Applicants: Self Electronics Co., Ltd., Zhejiang (CN); Wanjiong Lin, Zhejiang (CN); Self Electronics USA Corporation, Norcross, GA (US)

(72) Inventors: Zuping He, Zhejiang (CN); Yuanfang Xue, Zhejiang (CN); Zhaoyong Zheng, Zhejiang (CN); Junjun Ying, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/148,285

(22) Filed: Dec. 29, 2022

(65) Prior Publication Data

US 2023/0213169 A1 Jul. 6, 2023

(30) Foreign Application Priority Data

Dec. 31, 2021 (CN) ......................... 202111670850.9

(51) Int. Cl.
*F21V 5/04* (2006.01)

(52) U.S. Cl.
CPC .................................... *F21V 5/045* (2013.01)

(58) Field of Classification Search
CPC ....................................................... F21V 5/045
See application file for complete search history.

(56) References Cited

U.S. PATENT DOCUMENTS

2014/0016326 A1* 1/2014 Dieker .................... F21V 13/04 362/327
2014/0112003 A1* 4/2014 Lacroix ................ G02B 19/009 362/329
2015/0285461 A1* 10/2015 Chen ......................... F21V 5/04 362/304
2015/0369430 A1* 12/2015 Vamberi ................... F21K 9/65 362/235
2016/0047528 A1* 2/2016 Goldstein ................. F21V 5/08 362/329
2018/0294389 A1* 10/2018 Tarsa ....................... H01L 33/58
2020/0240613 A1* 7/2020 Merriam ............ G02B 27/0955
2022/0186909 A1* 6/2022 He ..................... G02B 19/0028

* cited by examiner

*Primary Examiner* — Christopher E Dunay
(74) *Attorney, Agent, or Firm* — Wang Law Firm, Inc.

(57) ABSTRACT

A lens and an illumination method thereof relates to the field of illumination technologies. The lens is provided with a concave space for accommodating a light source, a first irradiation part is formed on a first side of an inner wall of the concave space, and second irradiation parts are formed on the bottom and a second side of the inner wall of the concave space; a main light beam emitted by the first irradiation part and a main light beam emitted by the second irradiation parts form an acute angle. By means of the present invention, an upper region and a lower region of a to-be-irradiated object can be illuminated through one light source at the same time, and the light source arrangement cost is reduced.

10 Claims, 3 Drawing Sheets

LENS AND ILLUMINATION METHOD

TECHNICAL FIELD

The present invention relates to the field of illumination technologies, and in particular, to a lens and an illumination method.

BACKGROUND

Currently, when illuminating an object with a relatively high height such as a goods shelf; generally, a light source is set above the front of an object. However, its light is relatively divergent, and it is difficult to illuminate an upper region and a lower region of the object at the same time.

Regarding this, someone may use two or more light sources to illuminate an upper region and a lower region of an object respectively; however, this arrangement is relatively complex and costly.

SUMMARY OF THE INVENTION

An objective of the present invention is to provide a lens and an illumination method. When illuminating an object with a relatively high height, an upper region and a lower region of the object may be illuminated at the same time, and the arrangement is simpler and the cost is lower.

To achieve the objective, the following technical solutions are adopted in the present invention:

The present invention provides a lens comprising a concave space for accommodating a light source, a first irradiation part is formed on a first side of an inner wall of the concave space, and second irradiation parts are formed on the bottom and a second side of the inner wall of the concave space;

a main light beam emitted by the first irradiation part and a main light beam emitted by the second irradiation parts form an acute angle.

Optionally, a beam angle of the first irradiation part is greater than that of the second irradiation parts.

Optionally, an irradiated area of a light incidence side of the second irradiation parts receiving the light source is larger than that of a light incidence side of the first irradiation part receiving the light source.

Optionally, the first irradiation part comprises a first light incidence surface, the first light incidence surface is provided on a first side of an inner wall of the concave space, and the first light incidence surface is a concave surface.

Optionally, the first irradiation part further comprises a first light emission surface, the first light emission surface is relatively arranged at intervals on one side of the first light incidence surface away from the light source, and the first light emission surface is a convex-transmitting surface.

Optionally, first light-transmitting convex ribs in strip shapes are provided on the first light emission surface to form a first linear light emission structure.

Optionally, the second irradiation parts comprise a second light incidence surface, a reflecting surface, and a second light emission surface, and the second light incidence surface comprises a convex-transmitting surface and a plane-transmitting surface.

The convex-transmitting surface is provided on the bottom of the inner wall of the concave space, and the plane-transmitting surface is arranged on a second side of the inner wall of the concave space. The second light emission surface is relatively arranged at intervals on one side of the convex-transmitting surface away from the light source, and the reflecting surface is arranged between an optical path of the plane-transmitting surface and that of the second light emission surface.

Optionally, second light-transmitting convex ribs in strip shapes are provided on the second light emission surface to form a second linear light emission structure.

Optionally, the second light emission surface is set as a plane.

The present invention further provides an illumination method, comprising the following steps:

irradiating a part of a light source to an upper region of a front surface of a to-be-irradiated object by means of a first irradiation part of the lens; and irradiating another part of the light source to a lower region of the front surface of the to-be-irradiated object by means of the second irradiation parts of the lens.

Beneficial effects of the present invention are that:

1. the present invention provides a lens; a light beam emitted by a first irradiation part and a main beam emitted by second irradiation parts are arranged with an acute angle; when the lens and a light source are arranged on the upper front part of a to-be-irradiated object, a part of light of the light source can be gathered by means of the first irradiation part to irradiate an upper region of the to-be-irradiated object, and another part of light of the light source can be gathered by means of the second irradiation parts to irradiate a lower region of the to-be-irradiated object, so as to illuminate the upper part and the lower part of the to-be-irradiated object at the same time. The overall setting is simple, which can reduce the cost of light source arrangement.

2. the present invention further provides an illumination method, that is, an upper region of a front surface of a to-be-irradiated object is irradiated by means of a first irradiation part of the lens, and a lower region of the front surface of the to-be-irradiated object is irradiated by means of second irradiation parts of the lens; meanwhile, the upper part and the lower part of the to-be-irradiated object are illuminated.

Figure 1:
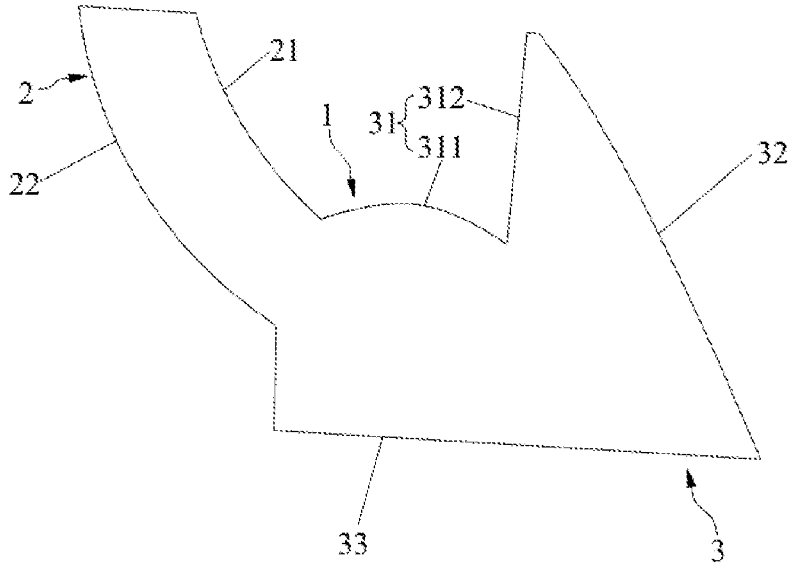
FIG. 1 is a schematic of a cross-section view of a lens provided by Embodiment 1 of the present invention.

100. Light source 200. To-be-irradiated object;

1. Concave space;

2. First irradiation part; 21. First light incidence surface; 22. First light emission surface; 23. First light-transmitting convex rib;

3. second irradiation parts; 31. First light incidence surface; 311. Convex-transmitting surface; 312. Plane-transmitting surface; 32. Reflecting surface; 33. Second light emission surface; 34. Second light-transmitting convex rib.

DETAILED DESCRIPTION

In order to make the technical problems solved by the present invention, the technical solutions adopted and the technical effects achieved clearer, the technical solutions of the present invention will be further described below in conjunction with the accompanying drawings and through specific implementation methods.

In the description of the present invention, unless otherwise clearly specified and limited, the terms "connected with", "connected to" and "fixed" should be understood in a broad sense, for example, it can be a fixed connection, a detachable connection, or an integrated connection; it can be a mechanical connection or an electrical connection; it can be a direct connection or an indirect connection through an intermediate medium, and it can be an internal communication of two components or a interaction relationship between two components. Those of ordinary skill in the art can understand the specific meanings of the above terms in the present invention according to specific situations.

In the description of this embodiment, the terms "up", "down", "left", "right" and other orientations or positional relationships are based on the orientations or positional relationships shown in the drawings, and are only for the convenience of description and simplification of operations. It is not intended to indicate or imply that the referred device or element must have a particular orientation, be constructed in a particular orientation, and operate in a particular orientation, which should not be understood as limiting the present invention. In addition, the terms "first" and "second" are only used to distinguish in description, and have no special meanings.

Embodiment 1

This embodiment provides a lens. As shown in FIG. 1, the lens includes a concave space 1 for accommodating a light source 100. The lens is formed by a first irradiation part 2 connected to a second irradiation part 3. The concave space 1 is defined by a concave light incidence surface 21 and a convex light incidence surface 31. The convex light incidence surface 31 is further divided into a convex-transmitting surface 311 and a plane-transmitting surface 312. The first irradiation part 2 is defined by the concave light incidence surface 21 and a convex light transmitting surface 22, the convex light transmitting surface 22 being spaced away from the light incidence surface 22 and the concave space 1. The second irradiation part 3 has a flat light emission surface 33. In combination with FIG. 2, a main light beam emitted by the first irradiation part 2 and a main light beam emitted by the second irradiation parts 3 form an acute angle. In FIG. 1, an included angle between the main light beam of the first irradiation part 2 and the main light beam of the second irradiation parts 3 is θ, and θ is an acute angle.

Figure 2:
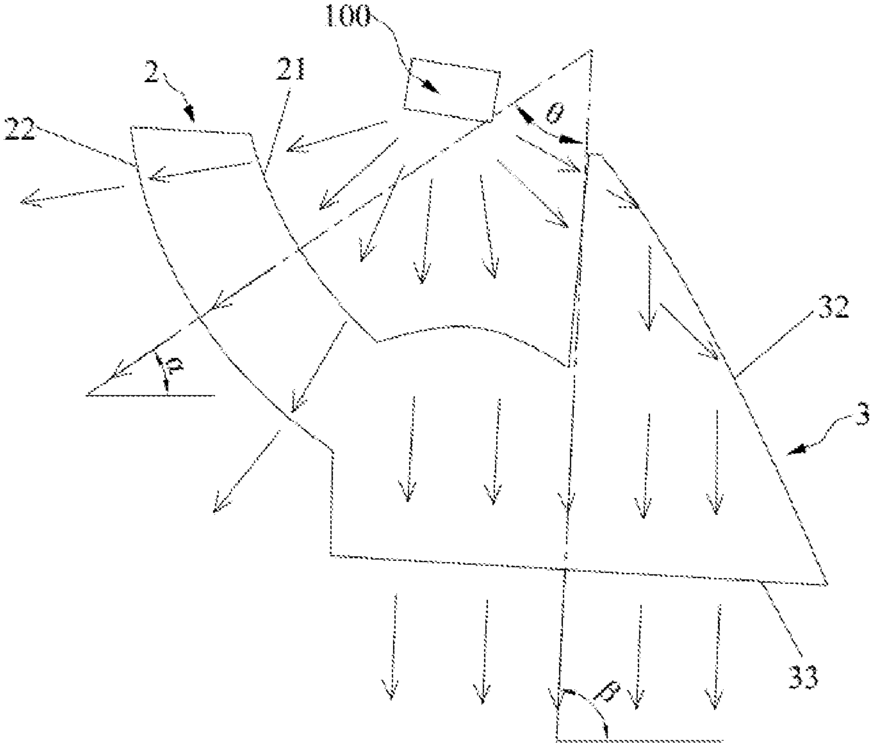
FIG. 2 is a schematic diagram of an optical path of a lens provided by Embodiment 1 of the present invention.
Figure 3:
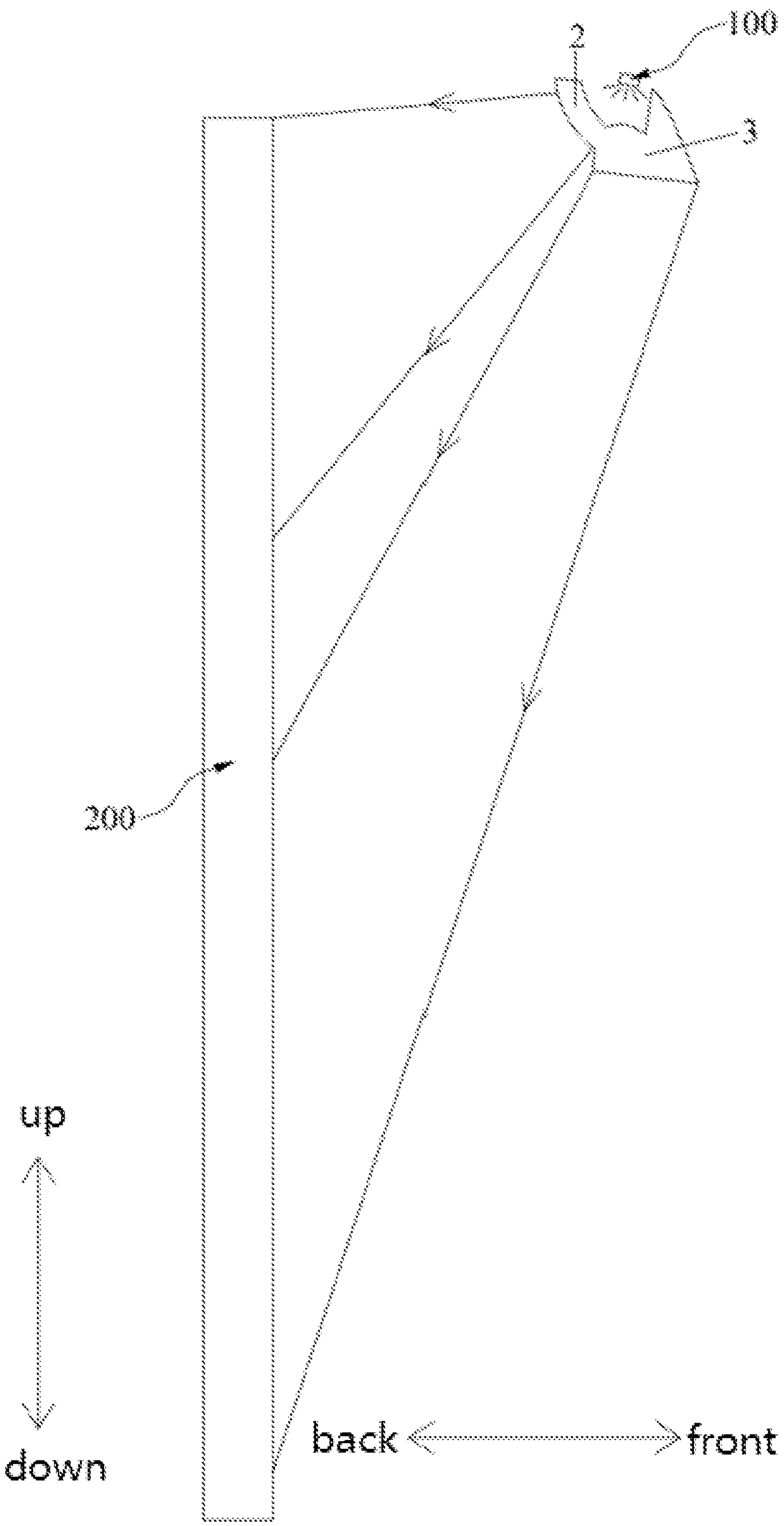
FIG. 3 is an illumination schematic diagram of a lens provided by Embodiment 1 of the present invention.

In combination with FIG. 1 to FIG. 3, when the lens and the light source 100 are arranged above a to-be-irradiated object 200, a part of light of the light source 100 can be gathered by means of the first irradiation part 2 to irradiate an upper region of the to-be-irradiated object 200, and another part of light of the light source 100 can be gathered by means of the second irradiation parts 3 to irradiate a lower region of the to-be-irradiated object 200; therefore, an upper region and a lower region of the to-be-irradiated object 200 can be illuminated by means of the light source 100 at the same time. The overall setting is simple, which can reduce the cost of light source arrangement.

Further, a beam angle of the first irradiation part 2 is greater than that of the second irradiation parts 3. At this time, the light can be better gathered by means of the second irradiation parts 3, the illumination luminance of the lower region of the to-be-irradiated object 200 can be improved, and the illumination luminance distribution will be more even. On the whole, the setting of the lens is simple, and the arrangement cost of the light source 100 can be reduced by means of the lens.

Actually, the lens is arranged with reference to the directions of FIG. 2 and FIG. 3. Even if the main light beam of the first irradiation part 2 is arranged in an acute angle α with front and rear directions of to-be-irradiated object 200, the main light beam of the second irradiation parts 3 is arranged in an acute angle β with front and rear directions of to-be-irradiated object 200, and β is greater than α, then an optical path of the first irradiation part 2 is arranged above the second irradiation parts 3; therefore, the light emitted by the first irradiation part 2 irradiates towards the side to illuminate an upper region of the to-be-irradiated object 200 and the light emitted by the second irradiation parts 3 irradiates towards the lower side to illuminate the lower region of the to-be-irradiated object 200.

In this embodiment, an irradiated area of a light incidence side of the second irradiation parts 3 receiving the light source 100 is larger than that of a light incidence side of the first irradiation part 2 receiving the light source 100, so that more light can enter the second irradiation parts 3 and irradiate the lower region of the to-be-irradiated object 200 by means of the second irradiation parts 3.

Further, the first irradiation part 2 and the second irradiation parts 3 are integrated so as to ensure the structural strength and facilitate processing and using.

The first irradiation part 2 and the second irradiation parts 3 are further introduced below.

As shown in FIG. 1, the first irradiation part 2 includes a first light incidence surface 21, and the first light incidence surface 21 is arranged on a first side of an inner wall of the concave space 1, and the first light incidence surface 21 is a concave surface. According to this, the light can be diffused through the concave surface to expand a light sweeping area.

Further, the first irradiation part 2 further includes a first light emission surface 22, the first light emission surface 22 is relatively arranged at intervals on one side of the first light incidence surface 21 away from the light source 100. In this embodiment, the first light emission surface 22 is a convex light-emitting surface, and the entirety of the first irradiation part 2 is a concave-convex lens. The light diffused via the first light incidence surface 21 can be gathered again by means of the first light emission surface 22 to avoid excessive light divergence.

As shown in FIG. 1, the second irradiation parts 3 include a second light incidence surface 31, a reflecting surface 32, and a second light emission surface 33; the second light incidence surface 31 includes a convex-transmitting surface 311 and a plane-transmitting surface 312. The convex-transmitting surface 311 is provided on the bottom of an inner wall of the concave space 1, the plane-transmitting surface 312 is provided on a second side of the inner wall of the concave space 1. The second light emission surface 33 is relatively arranged at intervals on one side of the convex-transmitting surface 311 away from the light source 100, and the reflecting surface 32 is arranged between an optical path of the plane-transmitting surface 312 and that of the second light emission surface 33.

According to this, with reference to FIG. 2, light at a relatively small angle to an optical axis of the light source 100 can be gathered by the convex transmitting surface 311 and then emitted by the second light emission surface 33; light at a relatively large angle to the optical axis of the light source 100 can be irradiated to the reflecting surface 32 by means of the plane-transmitting surface 312 and then reflected by the reflecting surface 32 to the second light emission surface 33, so as to ensure that more light can be emitted from the second light emission surface 33 and ensure the irradiation luminance of the lower region of the to-be-irradiated object 200.

In this embodiment, the second light emission surface 33 is a plane, the convex-transmitting surface 311 cooperates with a part of the second light emission surface 33 to form a planoconvex lens structure. The reflecting surface 32 is a paraboloid so that more light can irradiate the second light emission surface 33. With reference to FIG. 1, the plane-transmitting surface 312, the reflecting surface 32, and another part of the second light emission surface 33 form a triangular lens structure.

This embodiment further provides an illumination method, including the following steps: irradiating a part of a light source 100 to an upper region of a front surface of a to-be-irradiated object 200 by means of a first irradiation part 2 of the lens; and irradiating another part of the light source 100 to a lower region of the front surface of the to-be-irradiated object 200 by means of the second irradiation parts 3 of the lens. By means of the illumination method, a light source 100 can irradiate the upper region and the lower region of the front surface of the to-be-irradiated object 200 at the same time; therefore, the illumination arrangement is simpler and the illumination cost is reduced.

Embodiment 2

This embodiment provides a lens, which is substantially the same as the structure of the lens provided by Embodiment 1, and the difference is merely that the lens in this embodiment is provided thereon with a light-transmitting convex rib.

Figure 4:
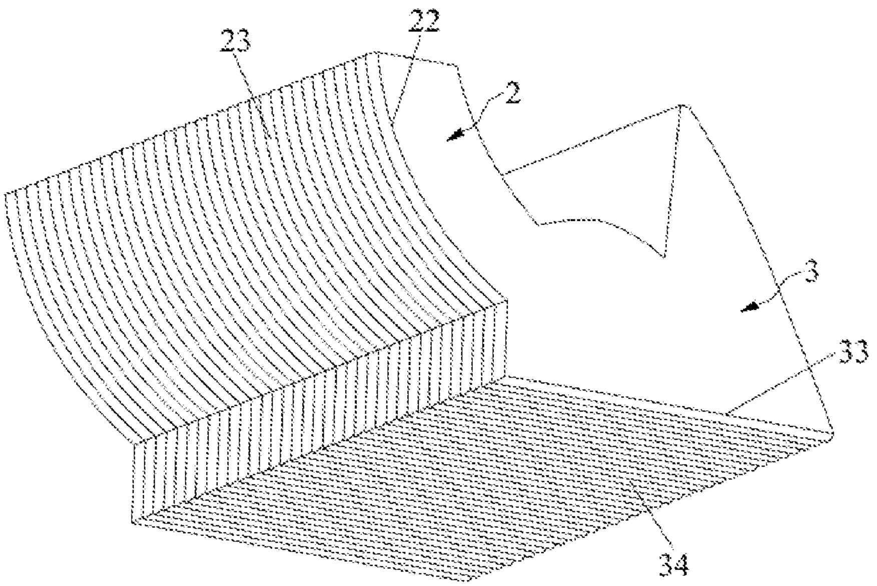
FIG. 4 is a schematic diagram of a three-dimensional structure provided by Embodiment 2 of the present invention.

As shown in FIG. 4, the first light-transmitting convex ribs 23 in strip shapes are provided on a first light emission surface 22 to form a first linear light emission structure. According to this, the light sweeping of light source 100 can be realized and the illumination effect can be improved. Similarly, the second light-transmitting convex ribs 34 in strip shapes are provided on the second light emission surface 33 to form a second linear light emission structure.

In this embodiment, there are multiple first light-transmitting convex ribs 23, and the multiple first light-transmitting convex ribs 23 are parallel to each other and are successively connected in a wavy shape to realize better light sweeping effects. The arrangement of the second light-transmitting convex ribs 34 is similar to that of the first light-transmitting convex rib 23, which is not repeated herein.

Further, the multiple first light-transmitting convex ribs 23 and multiple second light-transmitting convex ribs 34 are correspondingly connected one by one, and each of the first light-transmitting convex ribs 23 is integrated with a second light-transmitting convex rib 34 so as to facilitate processing.

The above content is merely a preferred embodiment of the present invention. For those of ordinary skill in the art, according to the idea of the present invention, there will be changes in the specific implementation manners and application scopes. The content of the description should not be understood as limitation of the present invention.

The invention claimed is:

1. A lens for covering a light source, comprising:

a first irradiation part (2) having a concave surface and a convex surface, the concave surface being defined by a first curve line, the convex surface being defined by a second curve line, the first curve line being substantially similar to the second curve line;

a second irradiation part (3) attached to the first irradiation part (2);

a concave space (1), defined by the first irradiation part (2) and the second irradiation part (3), for accommodating the light source (100), wherein the second irradiation part (3) is defined by a convex transmitting surface (311), a plane-transmitting surface (312), a reflecting surface (32), and a second light emission surface (33), the convex transmitting surface (311) and the plane-transmitting surface (312) face the light source, the convex transmitting surface (311) is defined by a third curve line, the convex transmitting surface (311) is connected to the concave surface, the plane-transmitting surface is defined by a straight line and connected to the convex transmitting surface (311), and a main light beam emitted from the first irradiation part (2) and a main light beam emitted from the second irradiation parts (3) form an acute angle.

2. The lens according to claim 1, wherein a beam angle of the first irradiation part (2) is greater than that of the second irradiation parts (3).

3. The lens according to claim 1, wherein an irradiated area of a light incidence side of the second irradiation parts (3) receiving the light source (100) is larger than that of a light incidence side of the first irradiation part (2) receiving the light source (100).

4. The lens according to claim 1, wherein the first irradiation part (2) comprises a first light incidence surface (21), the first light incidence surface (21) is provided on a first side of an inner wall of the concave space (1), and the first light incidence surface (21) is the concave surface.

5. The lens according to claim 4, wherein the first irradiation part (2) further comprises a first light emission surface (22), the first light emission surface (22) is relatively arranged at intervals on one side of the first light incidence surface (21) away from the light source (100), and the first light emission surface (22) is the convex surface.

6. The lens according to claim 5, wherein first light-transmitting convex ribs (23) in strip shapes are provided on the first light emission surface (22) to form a first linear light emission structure.

7. The lens according to claim 1, wherein the second irradiation parts (3) comprise a second light incidence surface (31), the reflecting surface (32), and the second light emission surface (33);

the second light incidence surface (31) comprises the convex-transmitting surface (311) and the plane-transmitting surface (312);

the convex-transmitting surface (311) is provided on the bottom of the inner wall of the concave space (1), and the plane-transmitting surface (312) is arranged on a second side of the inner wall of the concave space (1), the second light emission surface (33) is arranged at intervals on one side of the convex-transmitting surface (311) away from the light source (100), and the reflecting surface (32) is arranged between an optical path of the plane-transmitting surface (312) and that of the second light emission surface (33).

8. The lens according to claim 7, wherein second light-transmitting convex ribs (34) in strip shapes are provided on the second light emission surface (33) to form a second linear light emission structure.

9. The lens according to claim 7, wherein the second light emission surface (33) is set as a plane.

10. An illumination method through the lens of claim 1, comprising the following steps:

irradiating, through a lens formed by a first irradiation part and a second irradiation part, the first irradiation part having a concave surface and a convex surface, and the first irradiation part and the second irradiation part forming a concave for placement of a light source, an upper region of a front surface of a to-be-irradiated object (200) by the first irradiation part (2); and irradiating a lower region of the front surface of the to-be-irradiated object (200) by the second irradiation parts (3) of the lens.

* * * * *